(12) United States Patent
Tseng et al.

(10) Patent No.: US 8,054,369 B2
(45) Date of Patent: Nov. 8, 2011

(54) IMAGE CAPTURING DEVICE

(75) Inventors: Cheng-Te Tseng, Taipei (TW); Tzu-Kan Chen, Taipei (TW); Meng-Hsin Kuo, Taipei (TW); Chia-Hsi Tsai, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 342 days.

(21) Appl. No.: 12/458,974

(22) Filed: Jul. 29, 2009

(65) Prior Publication Data

US 2010/0123814 A1    May 20, 2010

(30) Foreign Application Priority Data

Nov. 20, 2008   (CN) .......................... 2008 1 0219377

(51) Int. Cl.
*H04N 5/225* (2006.01)
*H04N 5/232* (2006.01)
*H01L 21/00* (2006.01)
*G02B 26/00* (2006.01)
*G03B 17/00* (2006.01)

(52) U.S. Cl. ........ 348/340; 348/345; 348/335; 348/374; 438/30; 359/237; 359/238; 359/290; 396/529

(58) Field of Classification Search .......... 348/373–376, 348/345–349, 340, 335; 438/30; 396/529–533; 359/237, 238, 290, 295, 642, 665, 666, 754
See application file for complete search history.

(56) References Cited

U.S. PATENT DOCUMENTS

| 2008/0013187 A1* | 1/2008 | Craen et al. ................... 359/665 |
| 2008/0165427 A1* | 7/2008 | Tseng et al. .................. 359/666 |
| 2009/0059101 A1* | 3/2009 | Wang et al. ...................... 349/2 |

FOREIGN PATENT DOCUMENTS

EP        1992968 A1 *  11/2008

* cited by examiner

*Primary Examiner* — Lin Ye
*Assistant Examiner* — Marly Camargo
(74) *Attorney, Agent, or Firm* — Rosenberg, Klein & Lee

(57) ABSTRACT

An image capturing device includes a base formed with a first receiving space defined by a bottom wall and a first surrounding wall, and a second receiving space defined by a top side of the first surrounding wall and a second surrounding wall. A lens module is mounted on the base for generating an optical image of an object. An auto-focusing module is disposed in the second receiving space for auto-focusing the optical image based on an external voltage. A sensing module is mounted in the first receiving space and on the bottom wall of the base, is disposed under the auto-focusing module, and is spaced apart from the lens module at a predetermined distance for sensing the optical image focused by the auto-focusing module so as to generate an electrical output corresponding to the optical image.

15 Claims, 7 Drawing Sheets

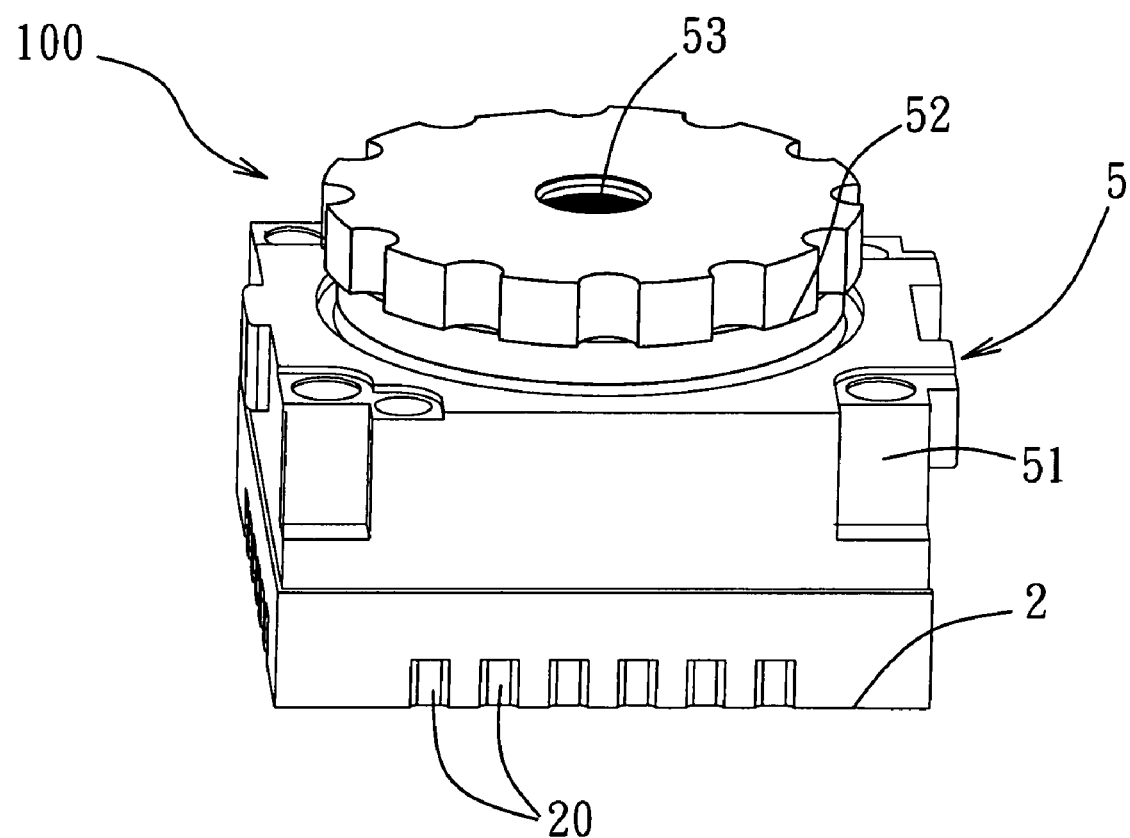
F I G. 2

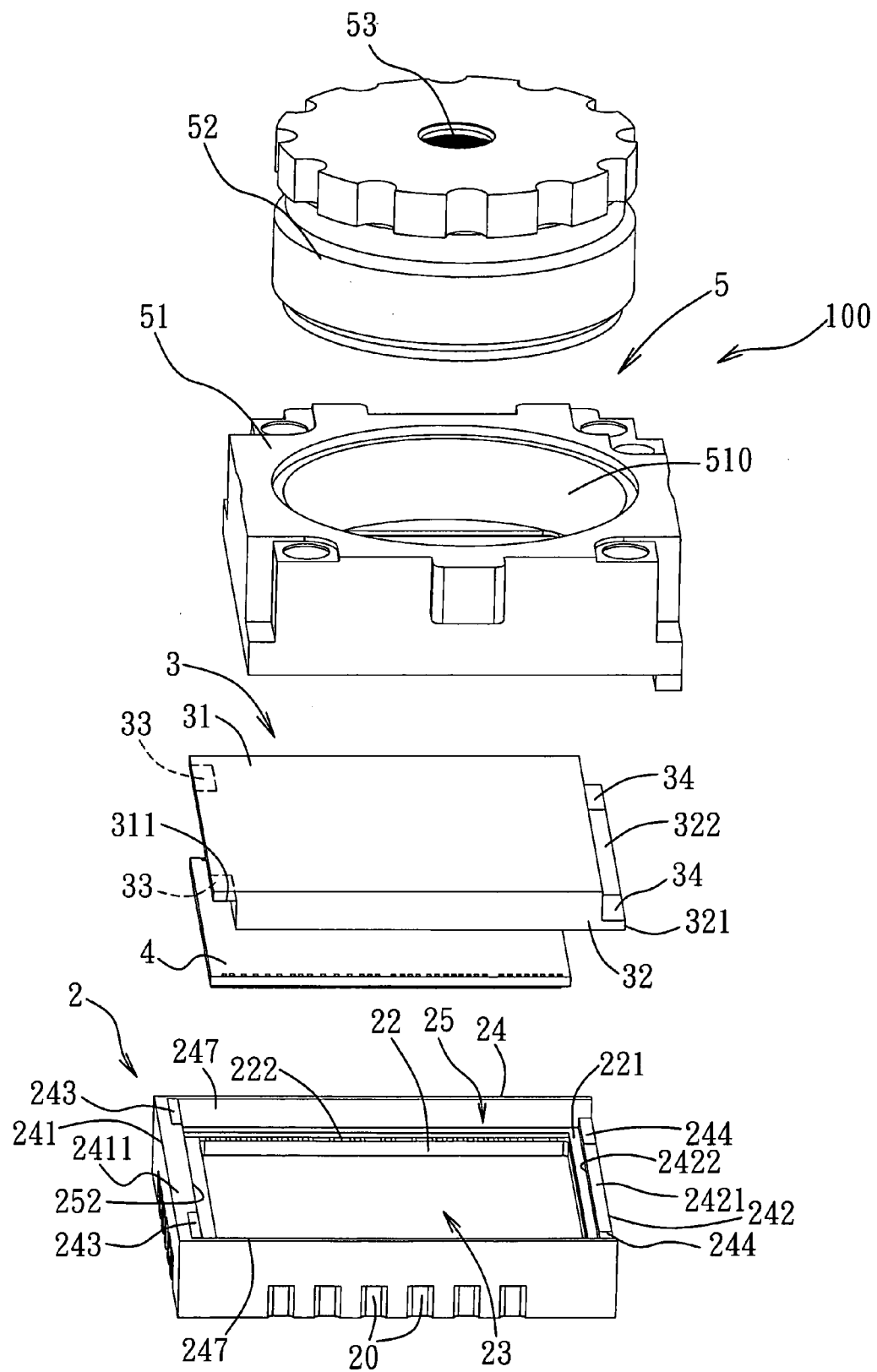
F I G. 3

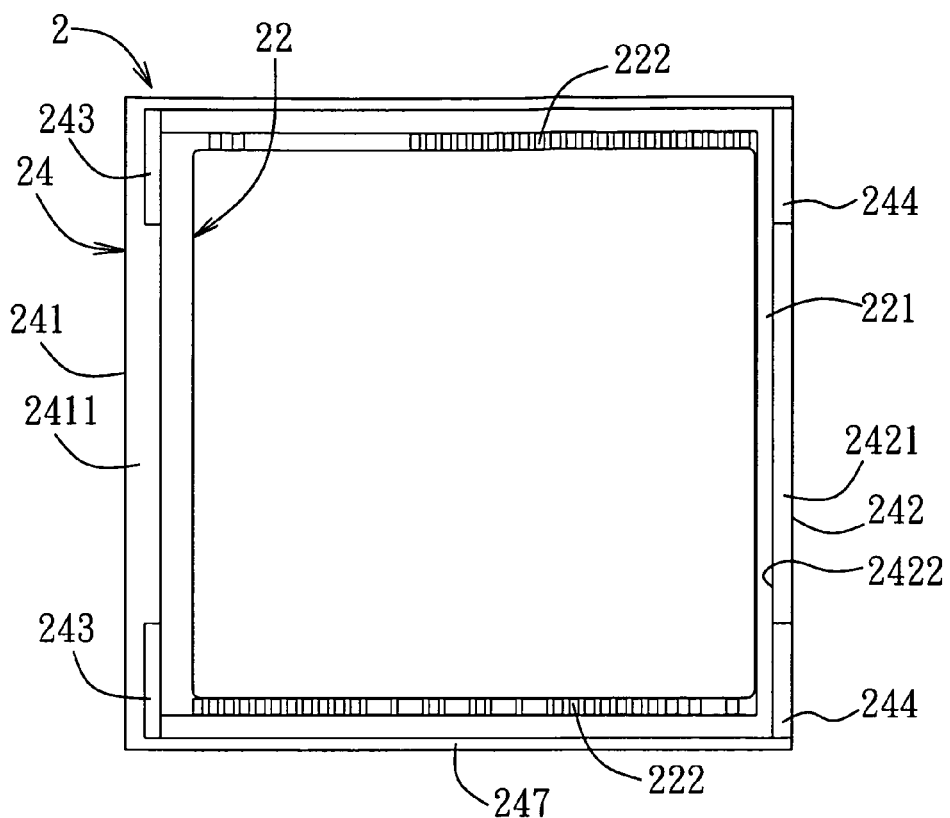
F I G. 5
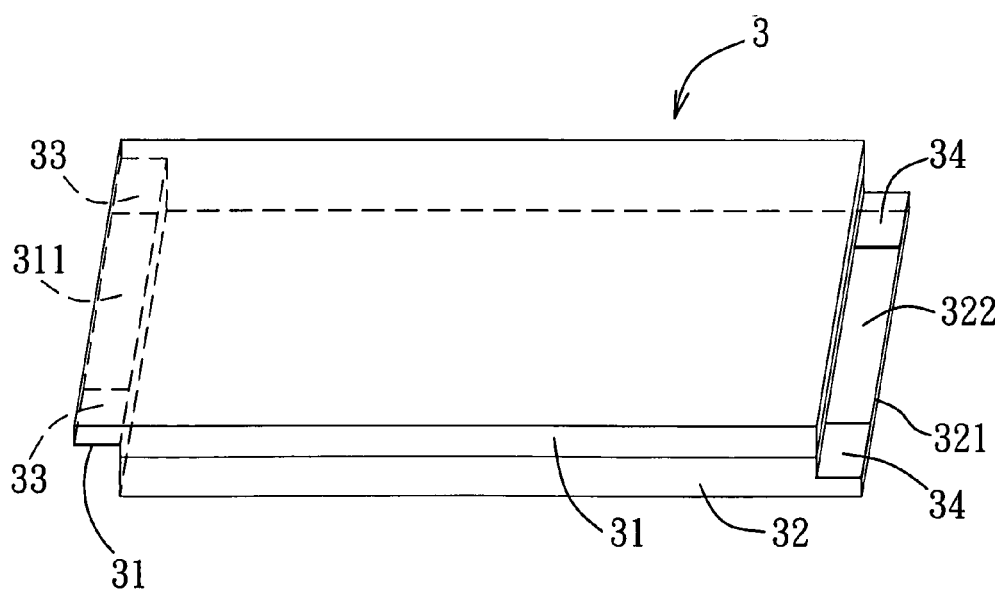
F I G. 6

_US 8,054,369 B2_

IMAGE CAPTURING DEVICE

CROSS-REFERENCE TO RELATED APPLICATION

This application claims priority of Chinese Application No. 200810219377.0, filed on Nov. 20, 2008.

BACKGROUND OF THE INVENTION

1. Field of the Invention

The invention relates to an image capturing device, more particularly to an image capturing device capable of auto-focusing.

2. Description of the Related Art

The design of a portable electronic apparatus, such as a mobile phone and a personal digital assistant, has a current trend toward small size. Therefore, it is desired to design an image capturing device for a portable electronic device having a small size.

Referring to FIG. 1, a conventional image capturing device 1 is shown to include a housing 11, a liquid lens 12 disposed in the housing 11, a fix lens 13 mounted in the housing 11 and disposed under the liquid lens 12, and an optical sensing module 14 mounted in the housing 11, disposed under the fix lens 13 and spaced apart from the fix lens 13 at a rear focus (d). The fix lens 13 generates an optical image of an object. The liquid lens 12 focuses the optical image generated by the fix lens 13 based an external voltage. The optical sensing module 14 senses the optical image focused by the liquid lens 12 so as to generate an electrical output corresponding to the optical image.

In such a configuration, since the liquid lens 12 is disposed above the fix lens 13, the conventional image capturing device 1 has a larger thickness in an axial direction (X) due to the rear focus (d). Therefore, when the conventional image capturing device 1 is applied to a portable electronic apparatus (not shown), the conventional image capturing device 1 having a larger size impedes miniaturization of the portable electronic apparatus.

SUMMARY OF THE INVENTION

Therefore, an object of the present invention is to provide an image capturing device that has a relatively small size.

According to the present invention, an image capturing device comprises:

a base mounted with a plurality of terminals thereon and having
 a bottom wall having a top surface,
 a first surrounding wall extending upwardly from the top surface of the bottom wall, having a top side, and cooperating with the bottom wall to define a first receiving space therebetween, and
 a second surrounding wall extending upwardly from the top side of the first surrounding wall and cooperating with the top side of the first surrounding wall to define a second receiving space therebetween in spatial communication with the first receiving space, the second receiving space being greater than the first receiving space;

a lens module mounted on the base for generating an optical image of an object;

an auto-focusing module mounted in the second receiving space in the base and disposed under the lens module for auto-focusing the optical image generated by the lens module based on an external voltage; and a sensing module mounted in the first receiving space in the base, disposed under the auto-focusing module, and spaced apart from the lens module at a predetermined distance for sensing the optical image focused by the auto-focusing module so as to generate an electrical output corresponding to the optical image.

BRIEF DESCRIPTION OF THE DRAWINGS

Other features and advantages of the present invention will become apparent in the following detailed description of the preferred embodiment with reference to the accompanying drawings, of which:

FIG. 2 is a perspective view showing the preferred embodiment of an image capturing device according to the present invention;

FIG. 3 is an exploded perspective view showing the preferred embodiment;

FIG. 5 is a schematic top view showing the base of the preferred embodiment;

FIG. 6 is a perspective view showing an auto-focusing module of the preferred embodiment;

DETAILED DESCRIPTION OF THE PREFERRED EMBODIMENT

Figure 1:
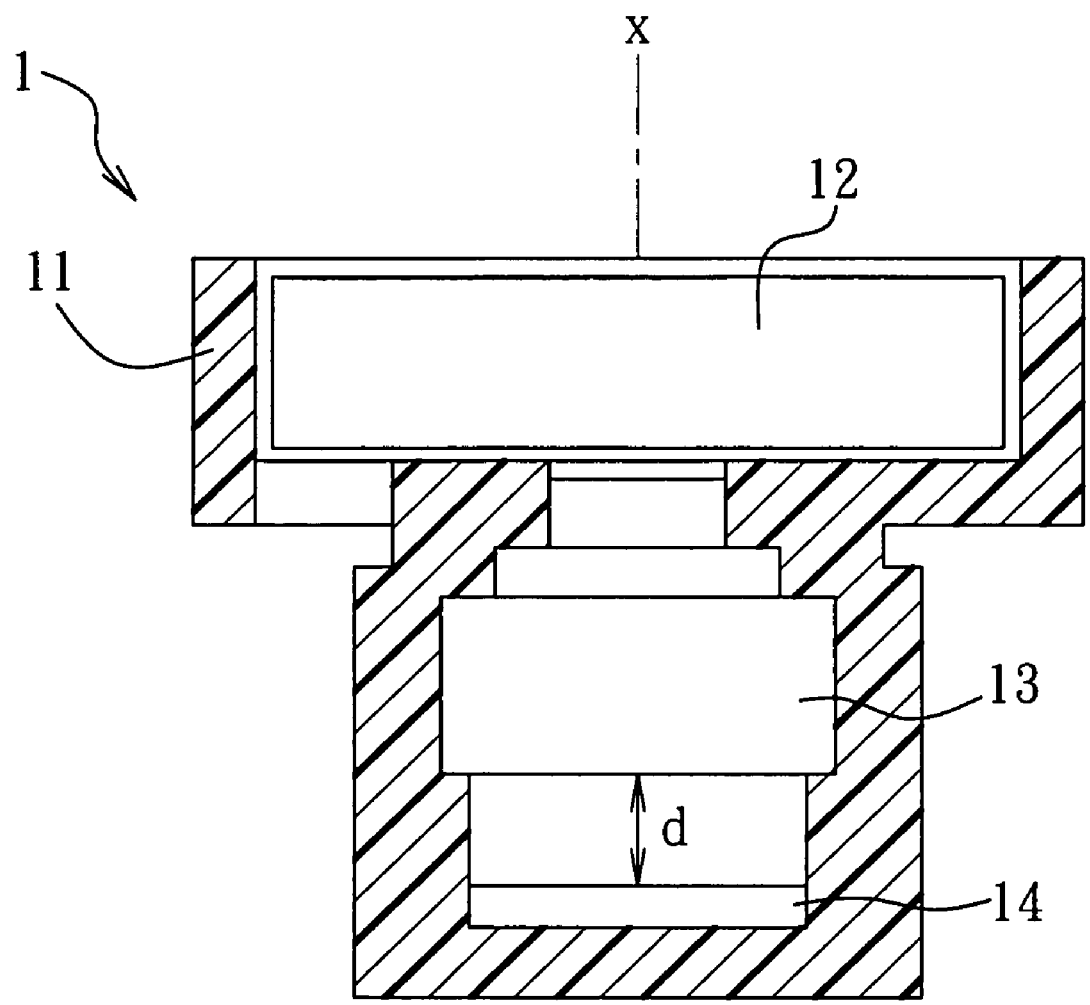
FIG. 1 is a partly schematic sectional view of a conventional image capturing device.

Referring to FIGS. 2, 3, 7 and 8, the preferred embodiment of an image capturing device 100 according to the present invention is shown to include a base 2, a lens module 5, an auto-focusing module 3, and a sensing module 4. The image capturing device 100 can be applied to a portable electronic apparatus, such as a mobile phone and a personal digital assistant.

Figure 4:
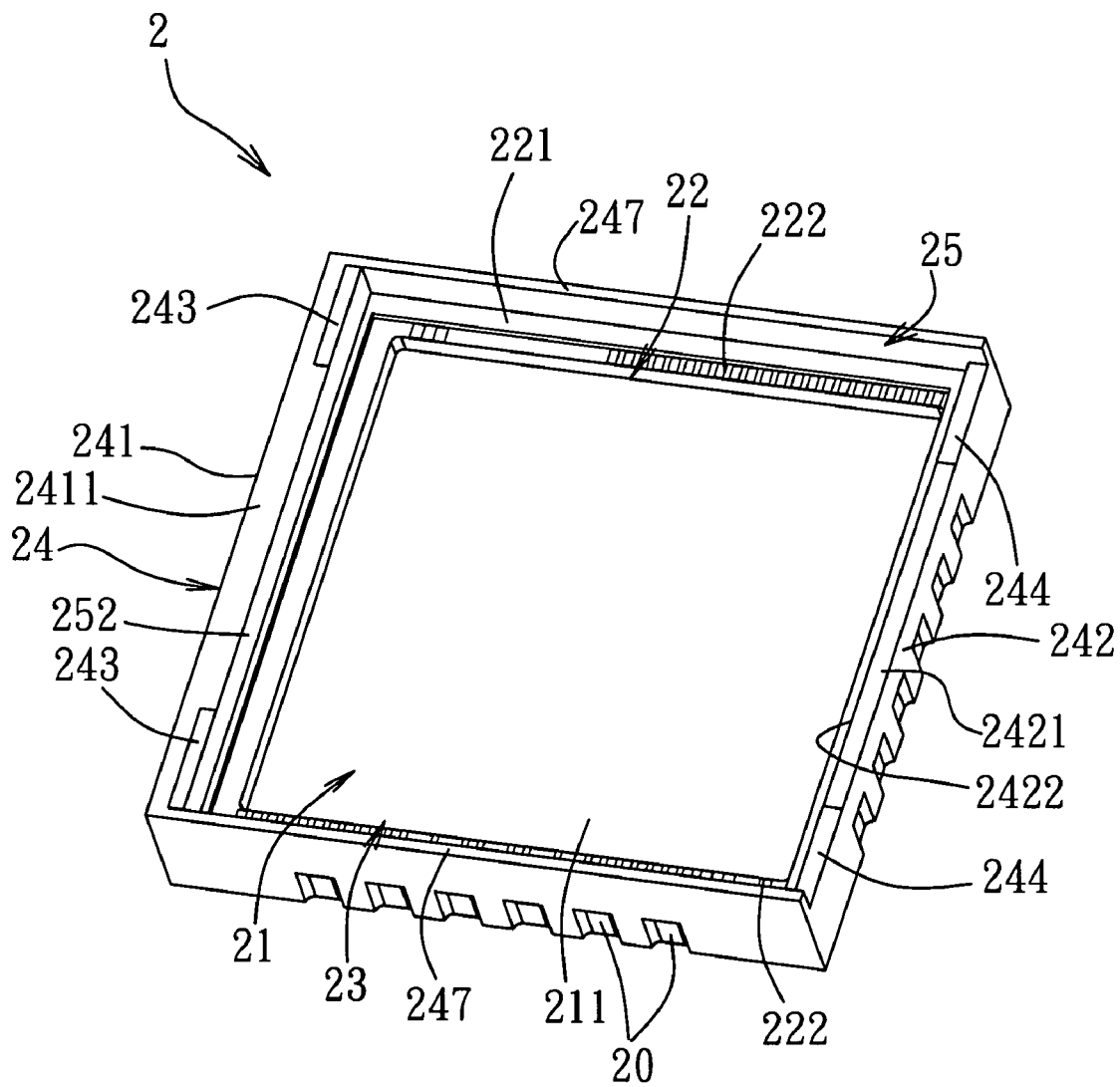
FIG. 4 is a perspective view showing a base of the preferred embodiment.
Figure 7:
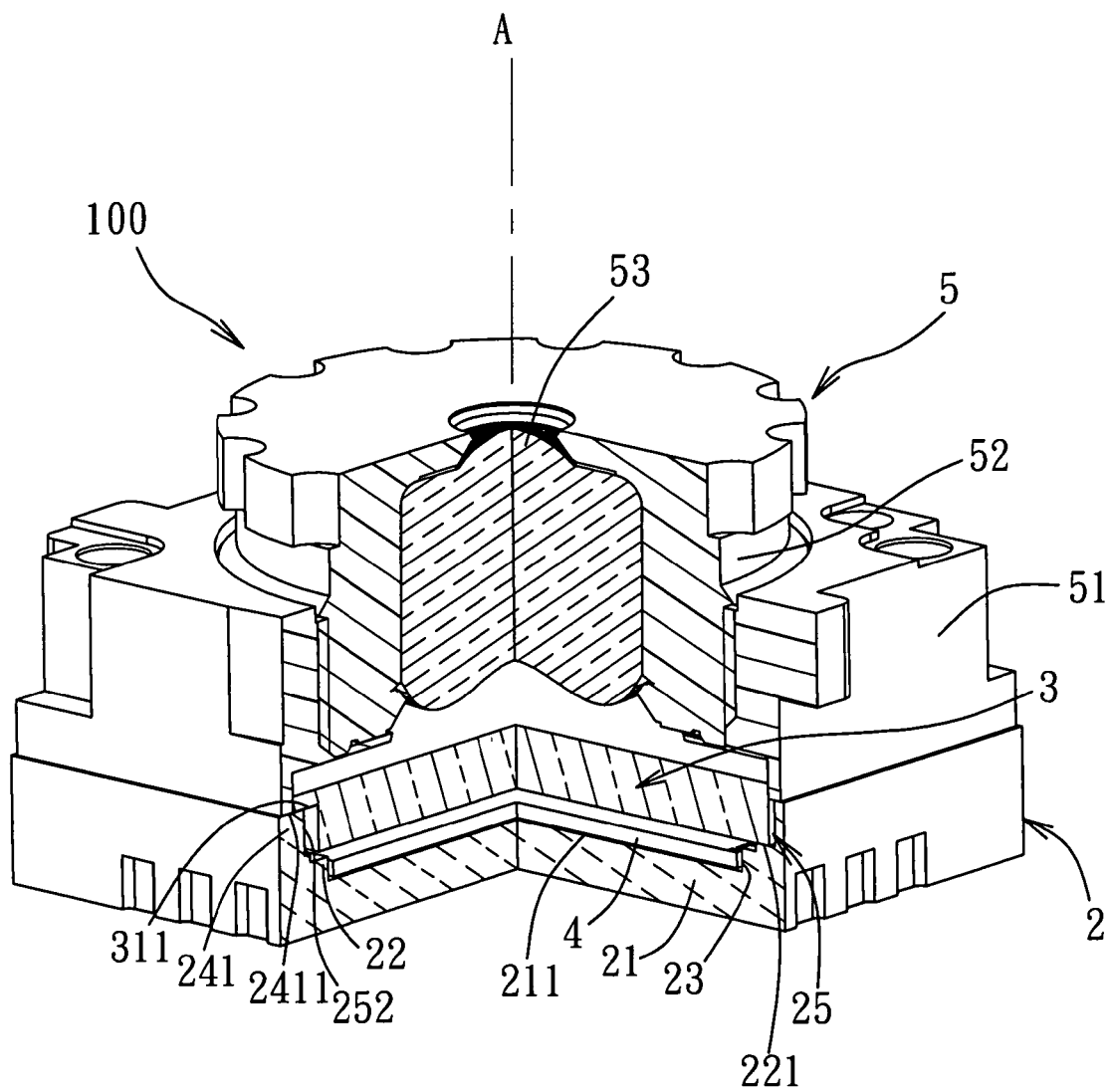
FIG. 7 is a partly cutaway perspective view showing the preferred embodiment.

Referring further to FIGS. 4 and 5, the base 2 is made of a ceramic material in this embodiment, is mounted with a plurality of terminals 20 thereon, and has a bottom wall 21, a first surrounding wall 22 and a second surrounding wall 24. The bottom wall 21 has a top surface 211. The first surrounding wall 22 extends upwardly from the top surface 211 of the bottom wall 21, has a top side 221, and cooperates with the bottom wall 21 to define a first receiving space 23 therebetween. The second surrounding wall 24 extends upwardly from the top side 221 of the first surrounding wall 22 and cooperates with the top side 221 of the first surrounding wall 22 to define a second receiving space 25 therebetween in spatial communication with the first receiving space 23. The second receiving space 25 is greater than the first receiving space 23. In this embodiment, the second surrounding wall 24 includes a first side wall portion 241, a second side wall portion 242 opposite to the first side wall portion 241, and opposite third side wall portions 247 interconnecting the first and second side wall portions 241, 242. The first side wall portion 241 has a height greater than that of the second side wall portion 242. The first side wall portion 241 has a top face 2411 provided with two first conductive pads 243 thereon each coupled to a corresponding terminal 20. The second side wall portion 242 has a top face 2421 provided with two second conductive pads 244 thereon each coupled to a corresponding terminal 20. As shown in FIGS. 4 and 5, the top side 221 of the first surrounding wall 22 is provided with a plurality of conductive contacts 222 thereon each coupled to a corresponding terminal 20.

Figure 8:
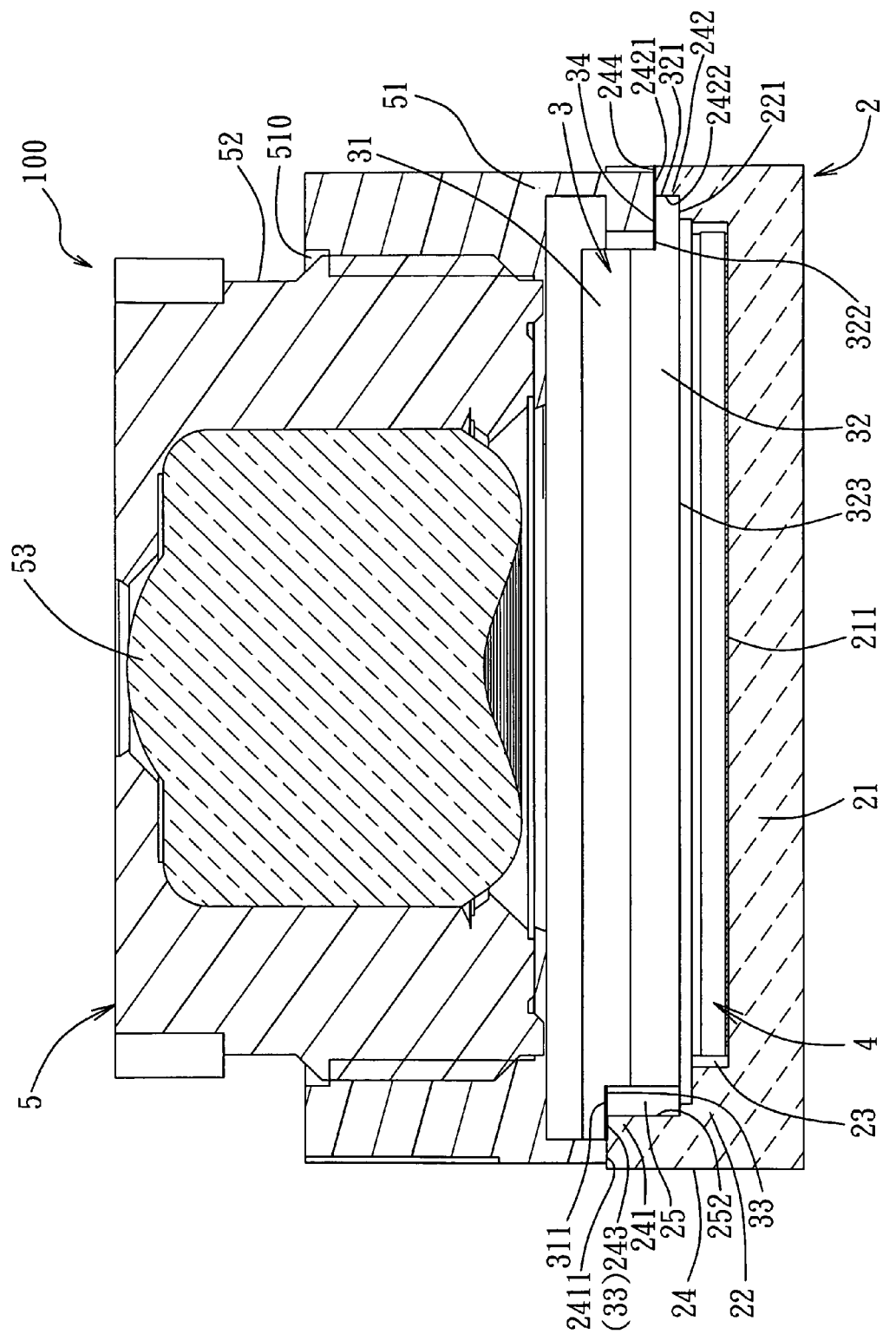
FIG. 8 is a partly schematic sectional view showing the preferred embodiment.

The lens module 5 is mounted on the base 2 for generating an optical image of an object. In this embodiment, the lens module 5 includes a mounting seat 51, a lens barrel 52 and a lens 53. The mounting seat 51 is mounted on the second surrounding wall 24 of the base 2 and is formed with a through hole 510, as best shown in FIG. 8. The lens barrel 52 is mounted in the mounting seat 51, and extends into the through hole 510 in the mounting seat 51. The lens 53 is mounted in the lens barrel 52.

The auto-focusing module 3 is mounted in the second receiving space 25, and is disposed under the lens module 5 for auto-focusing the optical image generated by the lens module 5 based on an external voltage. In this embodiment, the auto-focusing module 3 is a liquid lens. In other embodiments, the auto-focusing module 3 can be a thermal actuated solid tunable lens. Referring further to FIG. 6, in order to attain auto-focusing between infinity focus and micro-focus, the auto-focusing module 3 preferably includes a first liquid crystal panel 31, and a second liquid crystal panel 32 disposed under and partially overlapping the first liquid crystal panel 31 in this embodiment. However, in other embodiments, the auto-focusing module 3 can be a single liquid crystal panel. The first liquid crystal panel 31 has a downwardly facing surface 311 serving as a first abutting surface of the auto-focusing module 3, abutting against the top face 2411 of the first side wall portion 241 of the second surrounding wall 24 of the base 2, and provided with two first conducting portions 33 thereon each coupled to a corresponding first conductive pad 243 on the top face 2411 of the first side wall portion 241 of the second surrounding wall 24 of the base 2 by means of solder paste or conductive adhesive coated therebetween, as best shown in FIG. 8. Thus, the first liquid crystal panel 31 is adapted to receive the external voltage through the first conducting portions 33, the first conductive pads 243 and the corresponding two terminals 20. The second liquid crystal panel 32 has a bottom surface 323 partially abutting against the top side 221 of the first surrounding wall 22 of the base 2, a lateral end surface 321 serving as a second abutting surface of the auto-focusing module 3 and abutting against an inner lateral surface 2422 of the second side wall portion 242 of the second surrounding wall 24 of the base 2, and an upwardly facing surface 322 connected to the inner lateral surface 2422, i.e., the second abutting surface, and provided with two second conducting portions 34 thereon coupled respectively to the second conductive pads 244 on the top face 2421 of the second side wall portion 242 of the second surrounding wall 24 of the base 2 by means of solder paste or conductive adhesive in the form of a film coated over each second conductive pad 244 and a corresponding second conducting portion 34. Thus, the second liquid crystal panel 32 is adapted to receive the external voltage through the second conducting portions 34, the second conductive pads 244 and the corresponding two terminals 20. It is noted that the external voltage applied to the first liquid crystal panel 31 can be different from the external voltage applied to the second liquid crystal panel 32.

It is noted that the first and second conductive pads 243, 244 are not limited to be disposed respectively on the top faces 2411, 2421 of the first and second side wall portions 241, 242 of the second surrounding wall 24 of the base 2. In other embodiments, the first conductive pads 243 can be disposed on another surface, such as an inner lateral end surface 252 of the first side wall portion 241 of the second surrounding wall 24 and are coupled respectively to the first conducting portions 33 on the first liquid crystal panel 31 by means of solder paste, conductive adhesive or wires. The second conductive pads 244 can be disposed on the inner lateral end surface 2422 of the second side wall portion 242 of the second surrounding wall 24 and are coupled respectively to the second conducting portions 34 on the second liquid crystal panel 32 by means of solder paste, conductive adhesive or wires.

The sensing module 4 is mounted in the first receiving space 23 in the base 2, is disposed under the auto-focusing module 3, and is spaced apart from the lens module 5 at a predetermined distance, such as a rear focus, for sensing the optical image focused by the auto-focusing module 3 so as to generate an electrical output corresponding to the optical image. In this embodiment, the sensing module 4 is a charge-coupled device (CCD). In other embodiments, the sensing module 4 can be a CMOS device. The sensing module 4 is attached to the top surface 211 of the bottom wall 21 of the base 2, and is coupled to the conductive contacts 222 on the top side 221 of the first surrounding wall 22 of the base 2 by means of wires (not shown). Thus, the electrical output generated by the sensing module 4 is outputted through the conductive contacts 222 and the corresponding terminals 20.

In such a configuration, since the auto-focusing module 3 is disposed between the lens module 5 and the sensing module 4, the image capturing device 100 of the present invention has a relatively smaller thickness in an axial direction (A) (see FIG. 7) as compared to the aforesaid conventional image capturing device 1. Therefore, the image capturing device 100 has a smaller size, thereby facilitating miniaturization of the portable electronic apparatus. Furthermore, since the auto-focusing module 3 and the sensing module 4 are positioned stably and respectively in the second and first receiving spaces 25, 23 in the base 2, optical-axis deviation in the axial direction (A) during assembly can be minimized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An image capturing device comprising:
a base mounted with a plurality of terminals thereon and having
a bottom wall having a top surface,
a first surrounding wall extending upwardly from said top surface of said bottom wall, having a top side, and cooperating with said bottom wall to define a first receiving space therebetween, and
a second surrounding wall extending upwardly from said top side of said first surrounding wall and cooperating with said top side of said first surrounding wall to define a second receiving space therebetween in spatial communication with said first receiving space, said second receiving space being greater than said first receiving space;
a lens module mounted on said base for generating an optical image of an object;
A liquid crystal panel based auto-focusing module mounted in said second receiving space in said base and disposed under said lens module for auto-focusing the optical image generated by said lens module based on an external voltage; and
a sensing module mounted in said first receiving space in said base, disposed under said auto-focusing module, and spaced apart from said lens module at a predetermined distance for sensing the optical image focused by said auto-focusing module so as to generate an electrical output corresponding to the optical image.

2. The image capturing device as claimed in claim 1, wherein:
   said second surrounding wall of said base includes a first side wall portion, and a second side wall portion opposite to said first side wall portion; and
   said auto-focusing module has a first abutting surface abutting against said first side wall portion of said second surrounding wall of said base, and a second abutting surface abutting against said second side wall portion of said second surrounding wall of said base.

3. The image capturing device as claimed in claim 2, wherein said auto-focusing module includes a first liquid crystal panel having said first abutting surface, and a second liquid crystal panel disposed under and partially overlapping said first liquid crystal panel, and having said second abutting surface.

4. The image capturing device as claimed in claim 3, wherein:
   said second surrounding wall of said base is provided with two first conductive pads on said first side wall portion, and two second conductive pads on said second side wall portion;
   said first liquid crystal panel is formed with two first conducting portions coupled respectively to said first conductive pads, and said second liquid crystal panel is formed with two second conducting portions coupled respectively to said second conductive pads; and
   each of said first and second conductive pads is coupled to a corresponding one of said terminals such that said auto-focusing module is adapted to receive the external voltage through said first and second conducting portions, said first and second conductive pads and the corresponding ones of said terminals.

5. The image capturing device as claimed in claim 3, wherein:
   said first side wall portion of said second surrounding wall has a height greater than that of said second side wall portion of said second surrounding wall; and
   said first liquid crystal panel has a downwardly facing surface serving as said first abutting surface and abutting against a top face of said first side wall portion of said second surrounding wall of said base, said second liquid crystal panel having a lateral end surface serving as said second abutting surface and abutting against an inner lateral surface of said second side wall portion of said second surrounding wall of said base.

6. The image capturing device as claimed in claim 5, wherein:
   said top face of said first side wall portion of said second surrounding wall of said base is provided with two first conductive pads each coupled to a corresponding one of said terminals; and
   said first abutting surface of said first liquid crystal panel is formed with two first conducting portions coupled respectively to said first conductive pads such that said first liquid crystal panel is adapted to receive the external voltage through said first conducting portions, said first conductive pads and the corresponding ones of said terminals.

7. The image capturing device as claimed in claim 6, wherein:
   said second side wall portion of said second surrounding wall of said base has a top face provided with two second conductive pads thereon each coupled to a corresponding one of said terminals; and
   said second liquid crystal panel has an upwardly facing surface connected to said second abutting surface and provided with two second conducting portions coupled respectively to said second conductive pads such that said second liquid crystal panel is adapted to receive the external voltage through said second conducting portions, said second conductive pads and the corresponding ones of said terminals.

8. The image capturing device as claimed in claim 7, wherein one of solder paste and conductive adhesive is coated between each of said first conductive pads and a corresponding one of said first conducting portions, one of solder paste and conductive adhesive in the form of a film being coated over each of said second conductive pads and a corresponding one of said second conducting portions.

9. The image capturing device as claimed in claim 5, wherein said second liquid crystal panel of said auto-focusing module has a bottom surface partially abutting against said top side of said first surrounding wall of said base.

10. The image capturing device as claimed in claim 1, wherein said auto-focusing module includes a liquid lens.

11. The image capturing device as claimed in claim 1, wherein said auto-focusing module includes first and second liquid crystal panels partially overlapping each other.

12. The image capturing device as claimed in claim 1, wherein said top side of said first surrounding wall of said base is provided with a plurality of conductive contacts each a corresponding one of said terminals and coupled to said sensing module and such that the electrical output generated by said sensing module is outputted through said conductive contacts and the corresponding ones of said terminals.

13. The image capturing device as claimed in claim 1, wherein said lens module includes:
   a mounting seat mounted on said second surrounding wall of said base and formed with a through hole;
   a lens barrel mounted in said mounting seat and extending into said through hole in said mounting seat; and
   a lens mounted in said lens barrel.

14. The image capturing device as claimed in claim 1, wherein said auto-focusing module includes a thermal actuated solid tunable lens.

15. The image capturing device as claimed in claim 1, wherein said base is made of a ceramic material.

* * * * *